(12) United States Patent
Nakagawa et al.

(10) Patent No.: US 12,409,592 B2
(45) Date of Patent: Sep. 9, 2025

(54) INJECTION MOLDING MACHINE AND INJECTION APPARATUS

(71) Applicant: THE JAPAN STEEL WORKS, LTD., Tokyo (JP)

(72) Inventors: Yutaka Nakagawa, Tokyo (JP); Yusuke Yonehara, Tokyo (JP); Toshio Toyoshima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 110 days.

(21) Appl. No.: 18/235,834

(22) Filed: Aug. 19, 2023

(65) Prior Publication Data

US 2024/0075669 A1 Mar. 7, 2024

(30) Foreign Application Priority Data

Sep. 2, 2022 (JP) .................................. 2022-139980

(51) Int. Cl.
B29C 45/50 (2006.01)

(52) U.S. Cl.
CPC .... B29C 45/5008 (2013.01); *B29C 2045/506* (2013.01); *B29C 2045/5088* (2013.01)

(58) Field of Classification Search
CPC .............................. B29C 45/531; B29C 45/54
See application file for complete search history.

(56) References Cited

U.S. PATENT DOCUMENTS

| | | | | |
|---|---|---|---|---|
| 4,066,189 A | * | 1/1978 | Toyoaki ................... | B29C 45/46 91/27 |
| 4,211,255 A | * | 7/1980 | Wisbey .................. | B29B 7/7631 137/625.48 |
| 5,219,512 A | * | 6/1993 | Tsutsumi ................ | B29C 45/77 425/149 |
| 5,246,660 A | * | 9/1993 | Tsutsumi ................ | B29C 45/52 366/82 |
| 6,595,265 B2 | * | 7/2003 | Kikuchi ................ | F04D 29/283 164/113 |
| 7,124,581 B2 | * | 10/2006 | Dantlgraber ........ | B29C 45/5008 60/560 |

FOREIGN PATENT DOCUMENTS

JP          2007-216285 A        8/2007

OTHER PUBLICATIONS

Machine translation JP2007216285A (Year: 2007).*

\* cited by examiner

*Primary Examiner* — Abbas Rashid
*Assistant Examiner* — Wayne K. Swier
(74) *Attorney, Agent, or Firm* — Potomac Law Group, PLLC

(57) ABSTRACT

A configuration of oil hydraulic power unit is simplified. In the oil hydraulic power unit, a port B and a port C are communicated to each other. By this, the hydraulic oil supplied to the port B can also be supplied to the port C even in exclusion of the solenoid valve and the flow-rate control valve, and, as a result, the hydraulic oil supplied to the port C contacts a side surface of the piston, and therefore, a backward pressure can be applied to the side surface of the piston. Thus, according to the oil hydraulic power unit, the backward movement of the piston can be achieved even in the exclusion of the solenoid valve and the flow-rate control valve.

14 Claims, 10 Drawing Sheets

INJECTION MOLDING MACHINE AND INJECTION APPARATUS

CROSS-REFERENCE TO RELATED APPLICATION

The present application claims priority from Japanese Patent Application No. 2022-139980 filed on Sep. 2, 2022, the content of which is hereby incorporated by reference into this application.

TECHNICAL FIELD

The present invention relates to an injection molding machine and an injection apparatus, and relates to a technique effectively applied to, for example, an injection molding machine and an injection apparatus each including an oil hydraulic power apparatus.

BACKGROUND ART

Japanese Patent Application Laid-open Publication No. 2007-216285 (Patent Document 1) describes a technique related to an injection molding machine capable of shifting from an injection process to a pressure holding process by rapidly decelerating an injection piston speed even without using a servo control valve which complicates a hydraulic circuit.

RELATED ART DOCUMENT

Patent Document

Patent Document 1: Japanese Patent Application Laid-open Publication No. 2007-216285

SUMMARY OF THE INVENTION

An injection molding machine is an apparatus that manufactures a molded product by kneading and melting a material and then pouring it into a mold, and is capable of handling a series of injection molding processes including melting the material, pouring (casting) it into the mold, cooling, and ejecting it. The injection molding machine is made of an injection apparatus which performs a material injection operation, and a mold clamping apparatus which molds the material injected from the injection apparatus.

In this regard, the present inventors have paid attention to the injection apparatus performing the material injection operation in the injection molding machine. The injection apparatus performs the material injection operation by using an oil hydraulic power apparatus, and therefore, it is desirable to simplify a configuration of the oil hydraulic power apparatus. That is, devisal for simplifying the configuration of the oil hydraulic power apparatus is desired in order to reduce the manufacturing cost of the injection molding machine and improve the reliability of the injection molding machine through simplifying the configuration of the oil hydraulic power apparatus.

An injection molding machine according to one embodiment includes: an injection apparatus configured to perform an injection operation for a material; and a mold clamping apparatus configured to mold the material injected from the injection apparatus. The injection apparatus described herein includes: a screw; a piston connected to the screw; and an oil hydraulic power unit configured to drive the piston in an axial direction. The oil hydraulic power unit includes: a first port serving as a supply passage for hydraulic oil at the time of a forward movement of the piston; a second port serving as a discharge passage for hydraulic oil at the time of the forward movement of the piston; and a third port serving as a discharge passage for hydraulic oil when the second port is closed by the piston at the time of the forward movement of the piston. Here, the second port and the third port are communicated to each other so that the hydraulic oil is supplied to the second port and is also supplied to the third port when the hydraulic oil is discharged from the first port at the time of a backward movement of the piston to enable the backward movement of the piston by the hydraulic oil supplied to the third port.

An injection apparatus according to one embodiment includes: a screw; a piston connected to the screw; and an oil hydraulic power unit configured to drive the piston in an axial direction. The oil hydraulic power unit includes: a first port serving as a supply passage for hydraulic oil at the time of a forward movement of the piston; a second port serving as a discharge passage for hydraulic oil at the time of the forward movement of the piston; and a third port serving as a discharge passage for hydraulic oil when the second port is closed by the piston at the time of the forward movement of the piston. Here, the second port and the third port are communicated to each other so that the hydraulic oil is supplied to the second port and is also supplied to the third port when the hydraulic oil is discharged from the first port at the time of a backward movement of the piston to enable the backward movement of the piston by the hydraulic oil supplied to the third port.

According to one embodiment, the configuration of the oil hydraulic power apparatus can be simplified.

BRIEF DESCRIPTIONS OF THE DRAWINGS

DESCRIPTIONS OF THE PREFERRED EMBODIMENTS

The same components are denoted by the same reference signs in principle throughout all the drawings for describing the embodiments, and the repetitive description thereof will be omitted. Note that hatching is used even in a plan view so as to make the drawings easy to see.

<Configuration of Injection Molding Machine>

The technical idea in the present embodiment can be widely applied to injection molding machines each including an injection apparatus and a mold clamping apparatus. In this regard, the technical idea in the embodiment will be explained below while exemplifying an injection molding machine in which one injection apparatus is provided for one mold clamping apparatus. However, the technical idea in the embodiment is not limited thereto, and can be also widely applied to, for example, a "multi-injection molding machine" in which a plurality of injection apparatuses are provided for one mold clamping apparatus.

<<Outline of Injection Molding Machine>>

Figure 1:
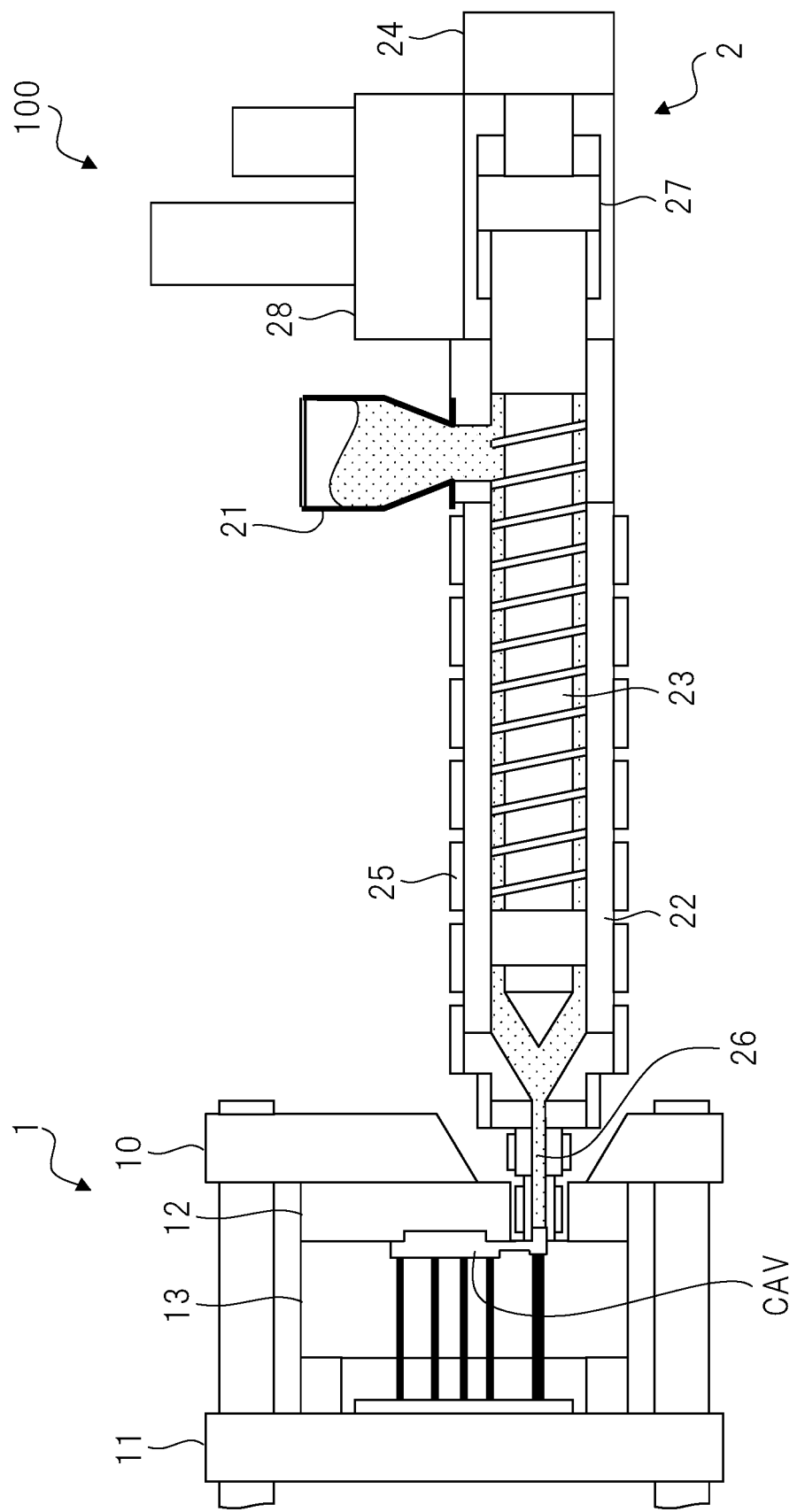
FIG. 1 is a schematic diagram showing a configuration of an injection molding machine.

FIG. 1 is a schematic diagram showing a configuration of an injection molding machine 100.

In FIG. 1, the injection molding machine 100 includes a mold clamping apparatus 1 and an injection apparatus 2. Here, the mold clamping apparatus 1 is an apparatus that performs a mold clamping operation. For example, the mold clamping apparatus 1 is constituted to be an apparatus to which a mold is attachable, the mold into which the material injected from the injection apparatus 2 is poured, and is an apparatus for manufacturing a molded product by pouring the material into a cavity (closed space) that is formed by performing the mold clamping operation to the mold. Meanwhile, the injection apparatus 2 is an apparatus that performs an injection operation, and is an apparatus that, for example, kneads and melts the material and injects the kneaded and melted material into the cavity that is formed in the mold clamping apparatus 1.

<<Configuration of Mold Clamping Apparatus>>

As shown in FIG. 1, the mold clamping apparatus 1 includes a movable platen 11 that is movable and a stationary platen 10 that is fixed, and is configured so as to variably control a distance between the movable platen 11 and the stationary platen 10. A movable mold (die) 13 and a stationary mold (die) 12 can be arranged between the movable platen 11 and the stationary platen 10. As a result, for example, when the distance between the movable platen 11 and the stationary platen 10 is variably controlled by the mold clamping apparatus 1, a distance between the movable mold 13 and the stationary mold 12 can be made smaller to "close the molds", or the distance between the movable mold 13 and the stationary mold 12 can be made larger to "open the molds". In this case, by the "mold closing" between the movable mold 13 and the stationary mold 12, a closed space (cavity) CAV is formed between the movable mold 13 and the stationary mold 12, and a molded product is formed by pouring the material into the closed space CAV. In particular, in the injection molding machine 100 shown in FIG. 1, by the "mold closing" between the movable mold 13 and the stationary mold 12, one closed space CAV is formed, and the molded product is formed by pouring the material into this closed space CAV. The mold clamping apparatus 1 is configured as described above.

<<Configuration of Injection Apparatus>>

Next, as shown in FIG. 1, an injection apparatus 2 that extrudes the material is connected to the mold clamping apparatus 1, and the material extruded from the injection apparatus 2 is configured to flow into the closed space CAV formed by the "mold closing" between the movable mold 13 and the stationary mold 12.

The injection apparatus 2 includes a hopper 21 for injecting the material (raw material) and a cylinder 22. By the injection of the material into the hopper 21, the material is kneaded by a rotatable screw 23 located inside the cylinder 22. Specifically, the screw 23 is connected to a screw rotating motor 24, and the screw 23 is rotated by driving the screw rotating motor 24.

Here, a heater 25 is arranged around the cylinder 22. The material injected into the cylinder 22 is kneaded by the screw 23 while being heated by the heater 25 to become molten material. A nozzle 26 is provided at the tip of the cylinder 22. The screw 23 is connected to a piston 27, and a forward movement and a backward movement of the piston 27 are controlled by an oil hydraulic power unit 28. Thus, for example, when the piston 27 is controlled so as to move forward by the oil hydraulic power unit 28, the screw 23 connected to the piston 27 moves forward, and, as a result, the molten material extruded by the screw 23 moving forward is injected out from the nozzle 26. The injection apparatus 2 is configured as described above.

A metallic material is assumed as the material (molten material) injected out from the injection apparatus 2. Specifically, a magnesium alloy is assumed as the material injected out from the injection apparatus 2. In this case, since the molten material made of magnesium alloy tends to solidify easily, it is necessary to increase a speed of injection from the injection apparatus 2. For this reason, the injection apparatus 2 is configured to use the oil hydraulic power unit 28 to perform the injection operation. However, the material injected out from the injection apparatus 2 is not limited to such a metallic material. Resin (plastic) or other materials can also be used.

<Operation of Injection Molding Machine>

The injection molding machine 100 is configured as described above, and its operation will be described below.

First, in FIG. 1, if the injected material is such a metallic material, a cavity surface of the opening movable mold 13 and stationary mold 12 is sprayed with a mold release agent. Then, the movable platen 11 of the mold clamping apparatus 1 is moved. As a result, the movable mold 13 is brought into contact with the stationary mold 12 to cause the "mold closing" state. After that, the piston 27 is controlled so as to move forward by the oil hydraulic power unit 28. As a result, the screw 23 connected to the piston 27 moves to the left side, that is, forward. As a result, the molten material of a predetermined amount stored between the nozzle 26 and the screw 23 by a measuring process described below is injected from the tip of the nozzle 26 into the closed space CAV (cavity) between the movable mold 13 and stationary mold 12 in the "mold closing" state. That is, the measured molten material is injected from the nozzle 26 into the closed space CAV (injection process).

Then, after the injection is completed, pressure is applied to the material in the closed space CAV through the molten material remaining in the cylinder 22 in order to compensate for shrinkage of the material that occurs due to cooling of the molten material. That is, after the molten material is injected, a state in which pressure is being applied to the closed space CAV by the screw 23 is maintained. This state is called a "pressure-holding state". With this state maintained, the molten material is cooled by the movable mold 13 and stationary mold 12, temperatures of which are controlled to be equal to or lower than a solidification temperature of the molten material (pressure-holding process). Specifically, by the movable mold 13 and stationary mold 12, the molten material is cooled down to the temperature being equal to or lower than the solidification temperature of the molten material filled in the closed space CAV.

Next, in FIG. 1, solid material is introduced from the hopper 21 into the cylinder 22. Then, the screw 23 connected to the piston 27 is moved backward by a predetermined amount by using the oil hydraulic power unit 28 to move the piston 27 backward at the same time of the rotation of the screw 23 by a screw rotating drive mechanism 24. During this, by the rotational drive of the screw 23, the material supplied from the hopper 21 is melted in the cylinder 22 of the injection apparatus 2, and is moved forward. That is, the material supplied from the hopper 21 is heated and melted to become the molten material moving forward by the heat from the heater 25 and the shear heating of the material caused by the rotation of the screw 23. As a result, a predetermined amount of the molten material is stored between the nozzle 26 and the screw 23 (measuring process).

After that, by operating the mold clamping apparatus 1, the state between the movable mold 13 and the stationary mold 12 is caused to be the "mold opening" state. Thus, after the state between the movable mold 13 and the stationary mold 12 is caused to be the "mold opening" state, the molded product is ejected by an ejector pin of an ejector apparatus included in the mold clamping apparatus 1. Accordingly, the molded product can be taken out from the mold clamping apparatus 1. This molded product becomes a product molded by the injection molding machine 100.

By repeating this series of operations, molded products of the same shape can be produced in a row. By repeatedly operating the injection molding machine 100 as described above, the molded products can be mass-produced.

<Study made by Inventors>

The present inventors have studied on the injection molding machine 100 including the configuration described above. Specifically, the inventors have considered the simplification of the oil hydraulic power unit 28 included in the injection apparatus 2 from the viewpoint of reducing the manufacturing cost or improving the reliability of the injection molding machine 100. As a result, it has been revealed that the existing oil hydraulic power unit 28 included in the injection apparatus 2 needs to be studied for improvement from the viewpoint of reducing the manufacturing cost or improving the reliability of the injection molding machine 100. Accordingly, in the injection molding machine 100, devisal for simplifying the oil hydraulic power unit 28 included in the injection apparatus 2 is desired. An oil hydraulic power unit 28R in the related art will be first described below. Then, the room for improvement that exists in the oil hydraulic power unit 28R in the related art will be described. After that, an oil hydraulic power unit 28A in the present embodiment with the devisal for the room for improvement that exists in the related art will be explained.

Explanation of Related Art

The "related art" described in this specification is not a publicly-known technique but a technique having issues found by the inventors, and is a technique of the premise of the technical idea of the present embodiment.

Figure 2:
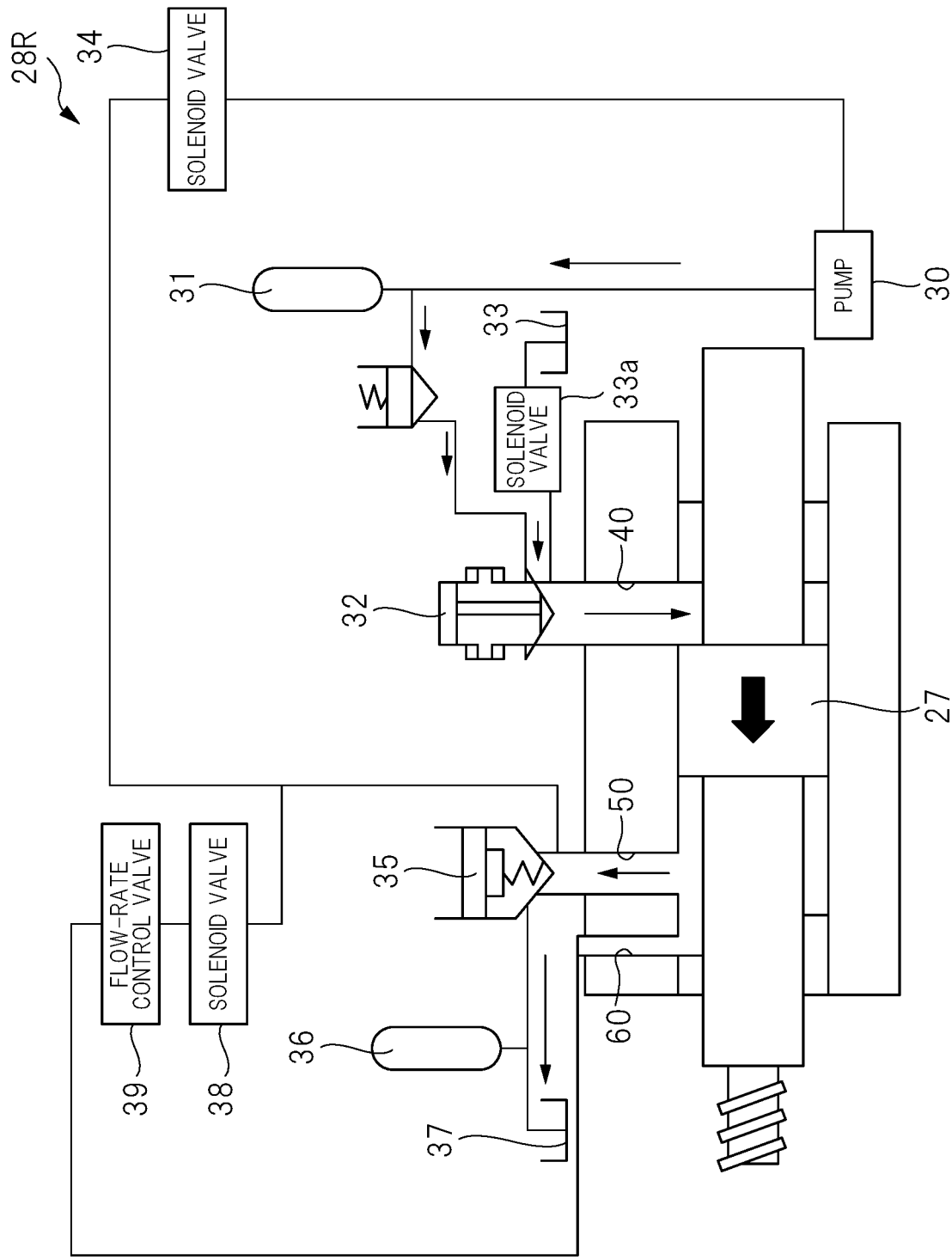
FIG. 2 is a diagram showing a configuration of an oil hydraulic power apparatus in a related art.

FIG. 2 is a diagram showing a configuration of the oil hydraulic power unit 28R in the related art.

In FIG. 2, the hydraulic member into which the piston 27 is inserted includes a port A 40, a port B 50, and a port C 60 which are flow passages for the hydraulic oil.

Meanwhile, as a configuration related to the port A 40, the oil hydraulic power unit 28R includes a pump 30, an accumulator 31, a servo valve 32, a solenoid valve 33a and a tank 33. The port A 40 is connected to the tank 33 through the solenoid valve 33a, and also is connected to an accumulator 31 through the servo valve 32. The accumulator 31 is connected to the pump 30.

Here, the pump 30 has the function of supplying the hydraulic oil to the flow passage, and the accumulator 31 has the function of accumulating the hydraulic oil. The servo valve 32 has the function of adjusting a flow rate of the hydraulic oil, and the tank 33 has the function of storing the hydraulic oil.

Then, as a configuration related to the port B 50, the oil hydraulic power unit 28R includes the pump 30, a solenoid valve 34, a logic valve 35, an accumulator 36, and a tank 37. The port B 50 is connected to the pump 30 through the solenoid valve 34, and is connected to the accumulator 36 and the tank 37 through the logic valve 35.

Here, the pump 30 has the function of supplying the hydraulic oil to the flow passage, and the solenoid valve 34 has an open/close mechanism. The logic valve 35 has the function of opening and closing the flow passage, and the accumulator 36 and the tank 37 have the function of storing the hydraulic oil.

Next, as a configuration related to the port C 60, the oil hydraulic power unit 28R includes the pump 30, the solenoid valve 34, a solenoid valve 38, and a flow-rate control valve 39. The port C 60 is connected to the pump 30 through the solenoid valve 34, the solenoid valve 38, and the flow-rate control valve 39.

Here, the pump 30 has the function of supplying the hydraulic oil to the flow passage, and the solenoid valve 34 and the solenoid valve 38 have an open/close mechanism. The flow-rate control valve 39 has the function of adjusting the flow rate of the hydraulic oil. The oil hydraulic power unit 28R in the related art is configured as described above.

<<Explanation of "Injection Operation">>

Next, the "injection operation" using the oil hydraulic power unit 28R will be described.

In FIG. 2, initially, the solenoid valve 33a, the solenoid valve 34, and the solenoid valve 38 are closed. Then, in this state, by operating the pump 30, the hydraulic oil is supplied from the pump 30 to the accumulator 31. As a result, the hydraulic oil is accumulated in the accumulator 31. After that, the accumulated hydraulic oil in the accumulator 31 is released at once. Then, the flow rate of the hydraulic oil released from the accumulator 31 is adjusted by the servo valve 32, and then, the hydraulic oil whose flow rate has been adjusted by the servo valve 32 is supplied to the port A 40.

When the hydraulic oil is supplied to the port A 40, the piston 27 is moved forward by the pressure of the hydraulic oil. At this time, the hydraulic oil extruded by the piston 27 moving forward enters the port B 50. The hydraulic oil that has entered the port B 50 is discharged from the port B 50 by opening the logic valve 35, and flows into the accumulator 36 and the tank 37. The hydraulic oil is supplied to the port A 40 while the hydraulic oil is discharged from the port B 50 as described above, and, as a result, the piston 27 moves forward. Since the solenoid valve 38 is closed, no hydraulic oil is discharged from the port C 60.

Figure 3:
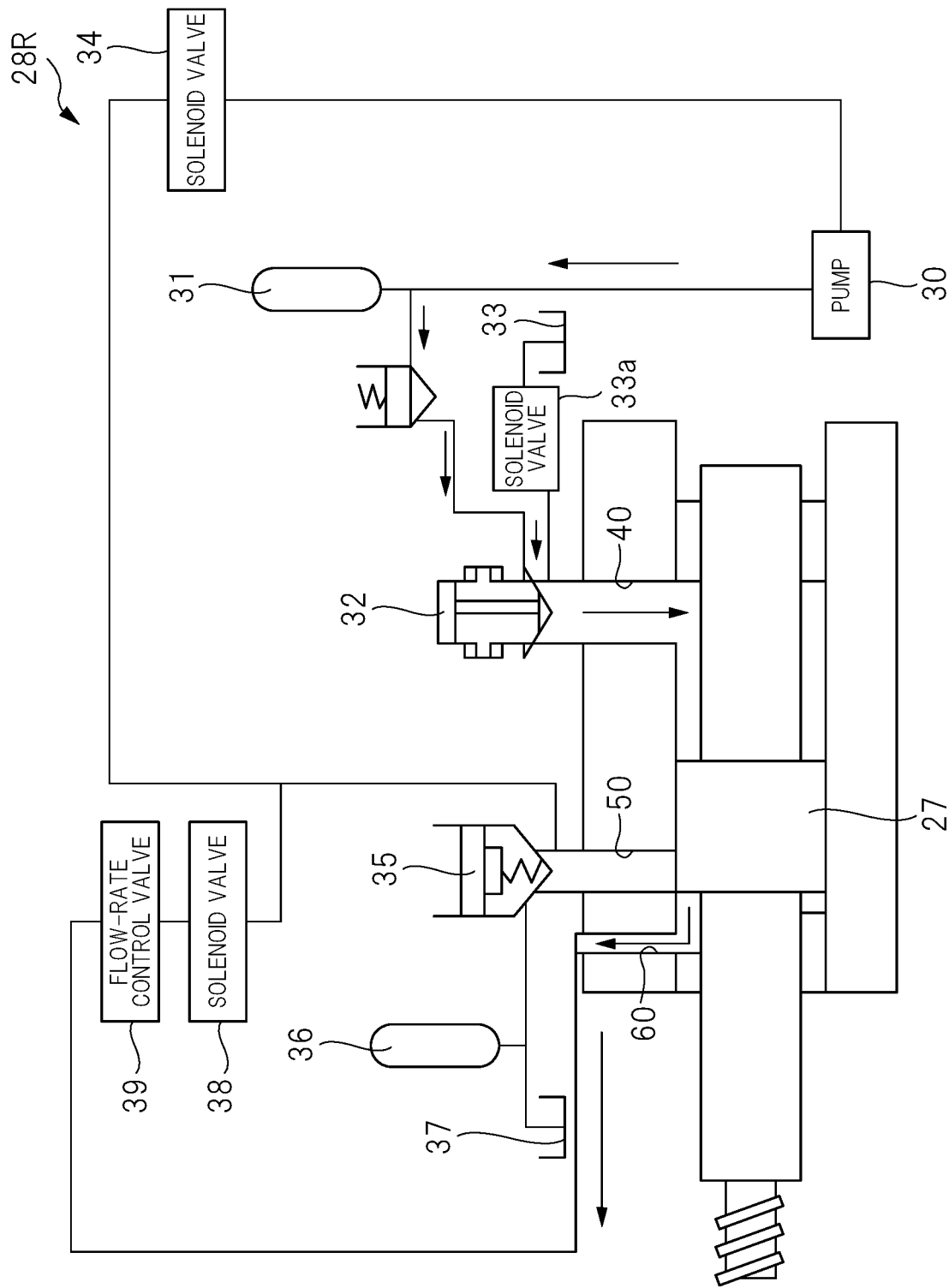
FIG. 3 is a diagram for explaining an "injection operation" in the related art.

Then, because of the forward movement of the piston 27, the piston 27 closes the port B 50 as shown in FIG. 3. In this case, the hydraulic oil is not discharged from the port B 50, and, as a result, the forward movement of the piston 27 is inhibited. That is, when the piston 27 moves to the position where the piston 27 closes the port B 50, the piston 27 decelerates rapidly. When such deceleration phenomena occurs, the hydraulic oil is not discharged from the port B 50 but is discharged from the port C 60 by opening the solenoid valve 34 and solenoid valve 38 as shown in FIG. 3.

Thus, according to the related art, when the hydraulic oil power unit 28R is controlled by the controller included in the injection molding machine 100, it is possible to achieve the "injection operation" of moving the piston 27 forward and then decelerating the piston 27 rapidly.

Figure 4:
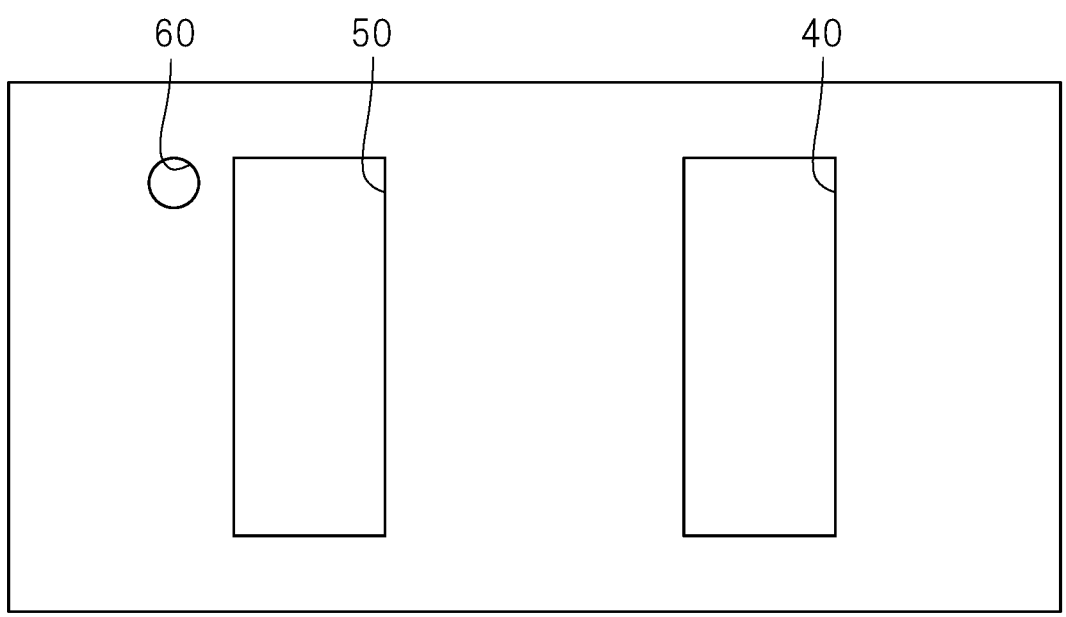
FIG. 4 is a plane view schematically showing an example of planar shapes of a port A, a port B, and a port C provided on an oil hydraulic member in the related art.

FIG. 4 is a plane view schematically showing an example of the planar shapes of the port A 40, port B 50, and port C 60 provided on a hydraulic member in the related art. As shown in FIG. 4, each planar shape of the port A 40 and port B 50 is, for example, a rectangular shape. In contrast, the planar shape of the port C 60 is a circular shape. And, the planar size of the port C 60 is smaller than that of each of the port A 40 and port B 50. The planar shapes of the port A 40, port B 50, and port C 60 are configured as described above.

<<Necessity of Backward Movement of Piston>>

As described above, in the "injection operation", the forward movement of the piston 27 is performed. In contrast, the piston 27 connected to the screw 23 needs to be moved backward in, for example, the "measuring process" where the screw 23 is moved backward while supplying the molten material forward from the hopper 21 so that the molten material can be injected in preparation for the next "injection operation" after the "injection operation". That is, the hydraulic oil power unit 28R needs to be configured to not only move the piston 27 forward but also move the piston 27 backward. Furthermore, the backward movement of the piston 27 is needed at the time of not only "the measuring operation" described above but also so-called "suck-back operation".

Here, the "suck-back operation" is an operation to move the piston 27 backward to prevent drooling from the nozzle 26 (material dripping from the nozzle 26) after the injection operation. From this, it is found that the piston 27 needs to move backward at the time of, for example, the "measuring operation" and "suck-back operation".

<<Explanation of Backward Movement of Piston>>

Accordingly, the backward movement of the piston 27 using the hydraulic oil power unit 28R will be described.

Figure 5:
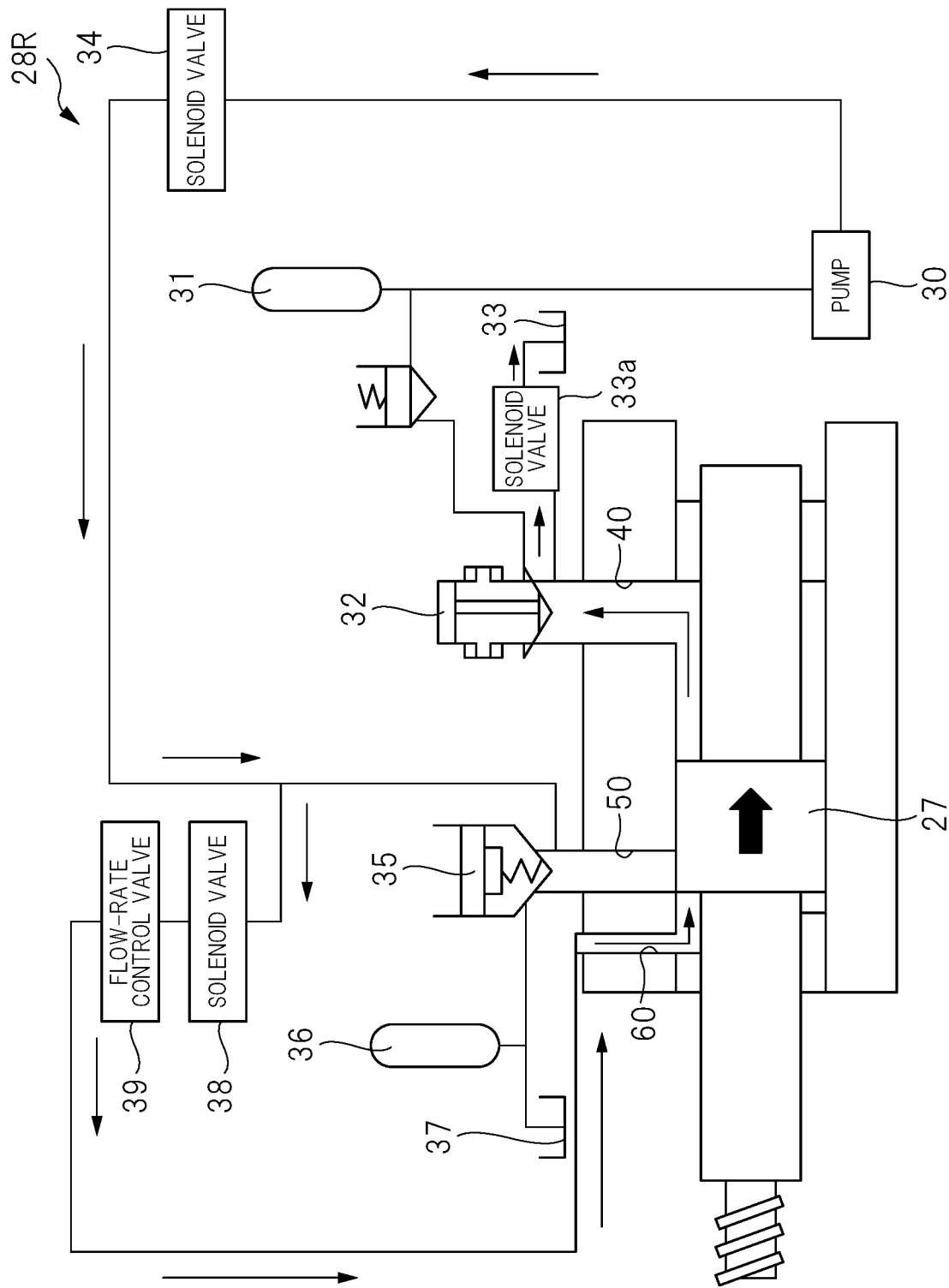
FIG. 5 is a diagram for explaining a backward movement of a piston in the related art.

FIG. 5 is a diagram for explaining the backward movement of the piston 27 using the hydraulic oil power unit 28R in the related art. In FIG. 5, the pump 30 is operated while the solenoid valves 34 and 38 are open. As a result, the hydraulic oil supplied from the pump 30 passes through the open solenoid valves 34 and 38, and then, its flow rate is adjusted by the flow-rate control valve 39, and the hydraulic oil is supplied to the C port 60. By the hydraulic oil supplied to the port C 60, pressure is applied to a side surface of the piston 27, and, as a result, the piston 27 moves backward. At this time, the hydraulic oil extruded by the piston 27 moving backward enters the port A 40. Then, by opening the solenoid valve 33a while the servo valve 32 is closed, the hydraulic oil that entered the port A 40 is discharged from the port A 40, and flows into the tank 33. The piston 27 is moved backward by supplying the hydraulic oil to the port B 50 while discharging the hydraulic oil from the port A 40 as described above.

<Room for Improvement>

As described above, the hydraulic oil power unit 28R in the related art can move the piston 27 backward. In this regard, the present inventors have studied the simplification of the hydraulic oil power unit 28R in the related art in order to reduce the manufacturing cost in the injection molding machine 100 and improve the reliability of the injection molding machine 100 through the simplification of the configuration of the hydraulic oil power unit 28R. At this time, the present inventors have newly found that there is room for improvement in that the simplification of the configuration of the hydraulic oil power unit 28R in the related art makes it difficult to achieve the backward movement of the piston 27.

The room for improvement that arises from the simplification of the configuration of the hydraulic oil power unit 28R in the related art will be described below.

Figure 6:
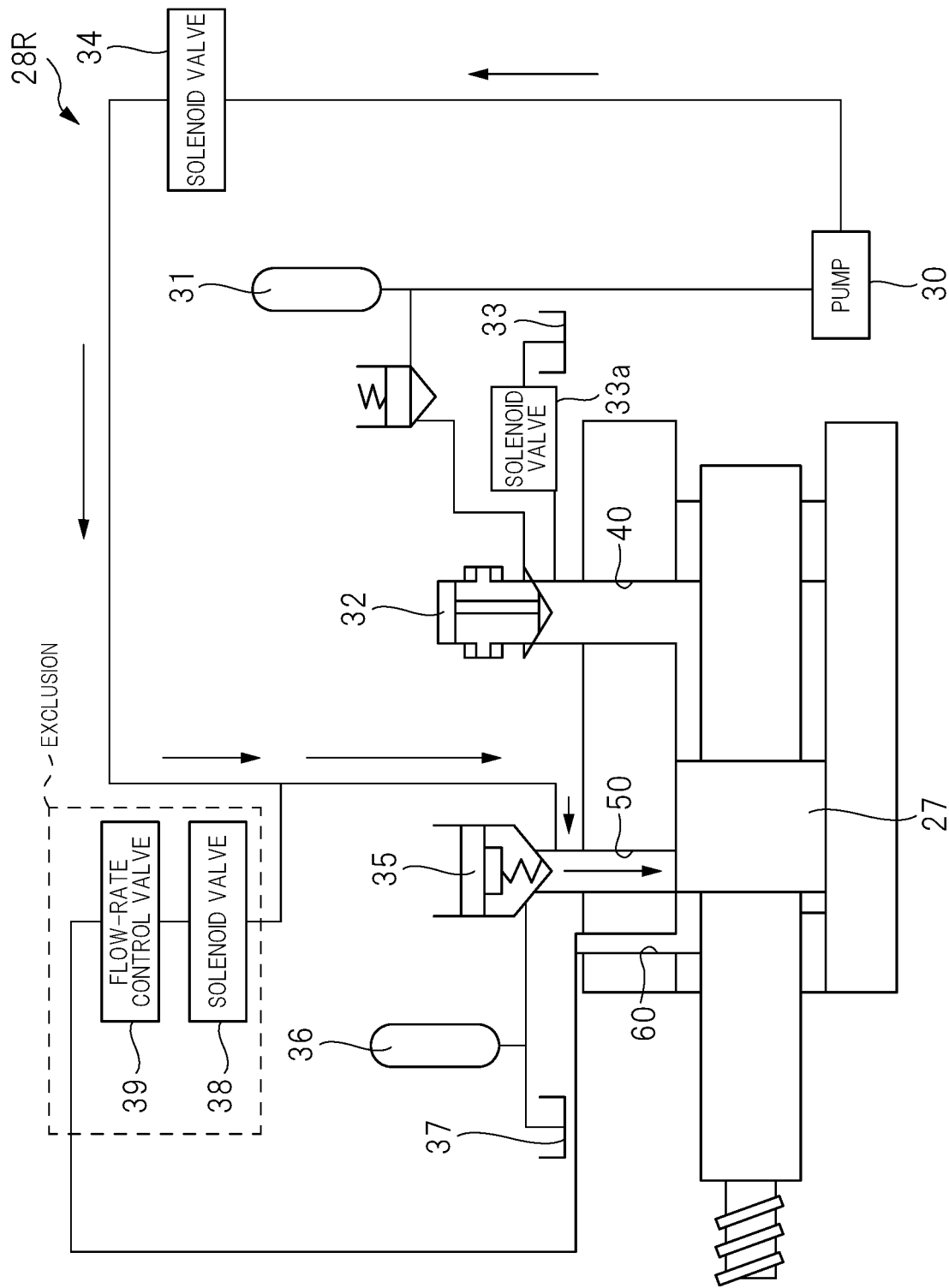
FIG. 6 is a diagram for explaining a room for improvement of the related art.

FIG. 6 is a diagram for explaining the room for improvement that exists in the related art.

As shown in FIG. 6, the present inventors have studied the simplification of the configuration of the hydraulic oil power unit 28R by, for example, excluding the solenoid valve 38 and the flow-rate control valve 39. In this case, as shown in FIG. 6, when the pump 30 is operated while the solenoid valve 34 is open, the hydraulic oil supplied from the pump 30 flows to the port B 50 through the open solenoid valve 34.

Here, in the rapid deceleration of the piston 27, the port B 50 is closed by the piston 27. Therefore, the hydraulic oil supplied to the port B 50 cannot contact the side surface of the piston 27. As a result, the hydraulic oil supplied to the port B 50 cannot move the piston 27 backward.

When the solenoid valve 38 and the flow-rate control valve 39 are excluded, the hydraulic oil is not supplied to the port C 60 but supplied to the port B 50. However, by the hydraulic oil supplied to the port B 50, the backward pressure cannot be applied to the side surface of piston 27. Therefore, in the related art, if the solenoid valve 38 and flow-rate control valve 39 are excluded, the piston 27 cannot move backward. That is, the related art has the room for improvement for the failing of the backward movement of the piston 27 caused by the exclusion of the solenoid valve 38 and the flow-rate control valve 39 to simplify the configuration of the hydraulic oil power unit 28R. Accordingly, in the present embodiment, a devisal to overcome the room for improvement that exists in the related art has been made. The technical idea in the present embodiment with the devisal will be described below.

Basic Idea in Embodiment

In the related art, the essential factor for the failing of the backward movement of the piston 27 caused when the solenoid valve 38 and the flow-rate control valve 39 are excluded is that the port B 50 and the port C 60 are physically separated from each other. This is because, if it is possible to supply the hydraulic oil to the port C 60 even in the exclusion of the solenoid valve 38 and the flow-rate control valve 39, the hydraulic oil supplied to the port C 60 can contact the side surface of the piston 27, and, as a result, the backward pressure can be applied to the side of the piston 27 by the hydraulic oil.

Accordingly, in the present embodiment in consideration of this point, the port B 50 is communicated to the port C 60. That is, the basic idea in the present embodiment is the idea of communicating the port B 50 to the port C 60. According to this basic idea, the hydraulic oil supplied to the port B 50 can also be supplied to the port C 60 even in the exclusion of the solenoid valve 38 and the flow-rate control valve 39, and, as a result, the hydraulic oil supplied to the port C 60 will contact the side surface of the piston 27, and thus, the backward pressure can be applied to the side surface of the piston 27. That is, according to the basic idea, the backward movement of the piston 27 can be achieved even in the exclusion of the solenoid valve 38 and the flow-rate control valve 39.

The embodiment embodying the basic idea will be described below.

EMBODIMENT

<<Configuration of Hydraulic Oil Power Unit>>

Figure 7:
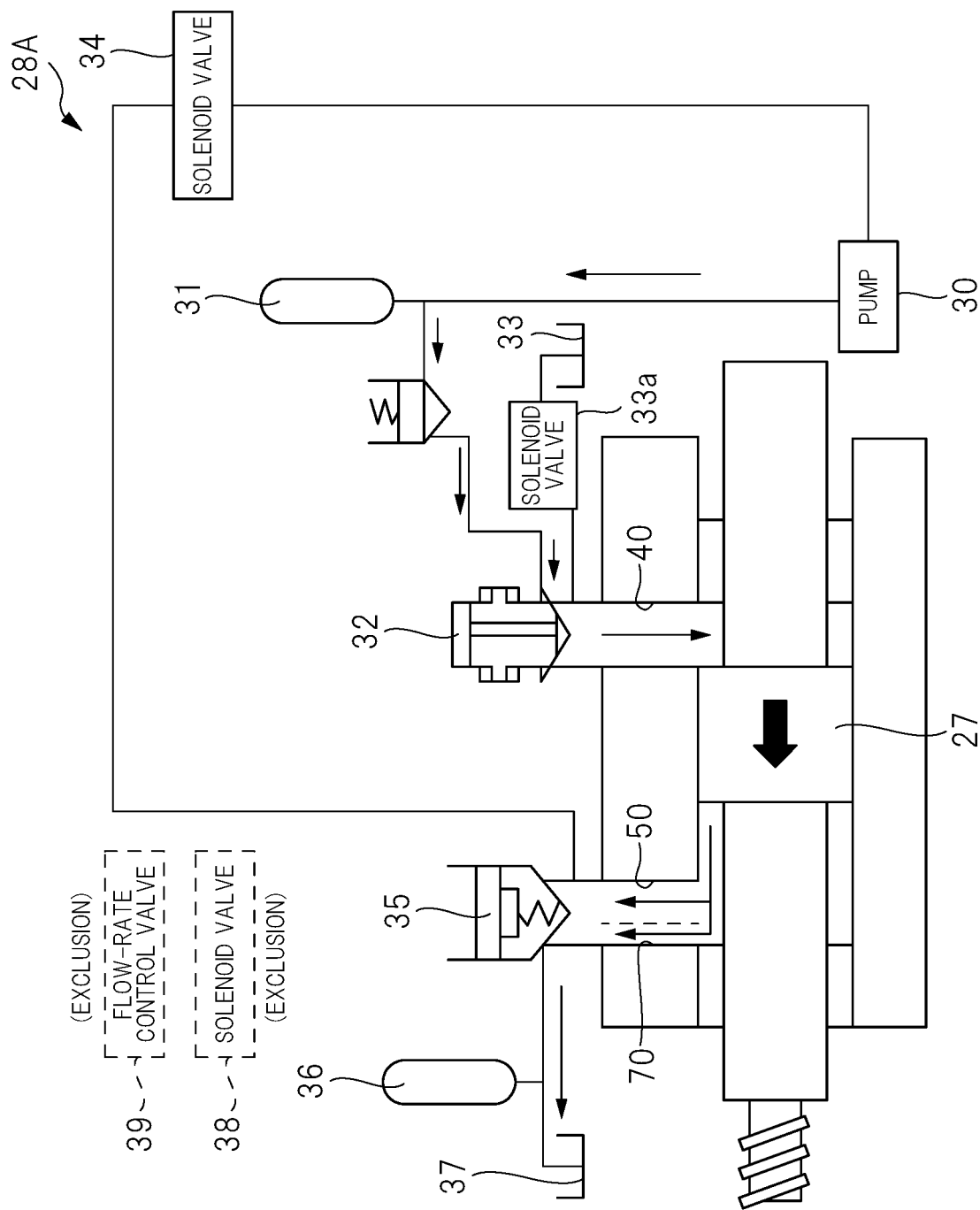
FIG. 7 is a diagram showing a configuration of an oil hydraulic power apparatus in an embodiment.

FIG. 7 is a diagram showing a configuration of the oil hydraulic power unit 28A in the embodiment.

In FIG. 7, the hydraulic member into which the piston 27 is inserted includes the port A 40, the port B 50, and the port C 70 which serve as the flow passages for the hydraulic oil. Here, as shown in FIG. 7, in the embodiment, the port B 50 and the port C 70 are communicated to each other.

As a configuration related to the port A 40, the oil hydraulic power unit 28R includes a pump 30, an accumulator 31, a servo valve 32, a solenoid valve 33a, and a tank 33. The port A 40 is connected to the tank 33 through the solenoid valve 33a, and also is connected to the accumulator 31 through the servo valve 32. The accumulator 31 is connected to the pump 30.

The pump 30 has the function of supplying the hydraulic oil to the flow passage, and the accumulator 31 has the function of accumulating the hydraulic oil. The servo valve 32 has the function of adjusting the flow rate of the hydraulic oil, and the tank 33 has the function of storing the hydraulic oil.

Next, as a configuration related to the port B 50 and port C 70 communicated to each other, the oil hydraulic power unit 28A includes a pump 30, a solenoid valve 34, a logic valve 35, an accumulator 36 and a tank 37. The port B 50 and port C 70 which are communicated to each other are connected to the pump 30 through the solenoid valve 34, and are connected to the accumulator 36 and tank 37 through the logic valve 35.

The pump 30 has the function of supplying the hydraulic oil to the flow passage, and the solenoid valve 34 has an open/close mechanism. The logic valve 35 has the function of opening and closing the flow passage, and the accumulator 36 and the tank 37 have the function of storing the hydraulic oil.

In the oil hydraulic power unit 28A in the embodiment, the solenoid valve 38 and flow-rate control valve 39 which are provided in the related art are excluded. As a result, the configuration of the oil hydraulic power unit 28A is simplified in the embodiment. The oil hydraulic power unit 28A is configured as described above.

Figure 8:
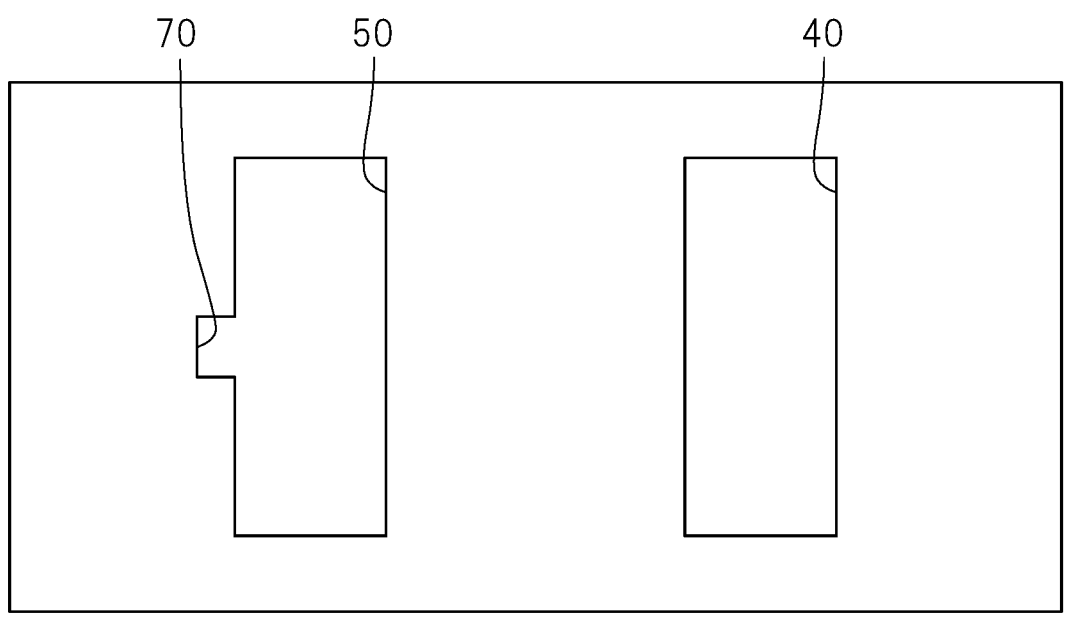
FIG. 8 is a plane view schematically showing an example of planar shapes of a port A, a port B, and a port C provided on an oil hydraulic member in the embodiment.

FIG. 8 is a plane view schematically showing an example of the planar shapes of the port A 40, port B 50, and port C 70 provided on the hydraulic member in the embodiment. As shown in FIG. 8, each planar shape of the port A 40 and port B 50 is, for example, a rectangular shape. The planar shape of the port C 70 is also a quadrangular shape, and the port C 70 is communicated to the port B 50 in plan view. In other words, the port B 50 and port C 70 are communicated to each other. That is, the port B 50 and port C 70 are not separated from each other, and are formed to be, for example, united. In this manner, for example, that hydraulic oil that has flowed into the port B 50 also flows into the port C 70. Here, the planar shape of the port C 70 is not limited to the quadrangular shape, but may be, for example, a circular or polygonal shape.

Furthermore, FIG. 8 shows a configuration in which the port C 70 is communicated to the center of the long side of the port B 50 which has the rectangular shape. However, the location of the port C 70 is not limited to the center of the long side of the port B 50. For example, the embodiment may have a configuration where the port C 70 is communicated to the top or bottom of the long side of the rectangular shaped port B 50, or the port C 70 may even be arranged so as to be communicated to the short side of the port B 50.

The planar size (cross-sectional area) of the port C 70 is smaller than the planar size (cross-sectional area) of each of the port A 40 and port B 50. In the embodiment, the planar shapes of the port A 40, port B 50, and port C 70 are configured as described above.

<<Explanation of "Injection Operation">>

Next, the "injection operation" using the oil hydraulic power unit 28A will be described.

In FIG. 7, initially, the solenoid valve 33a and the solenoid valve 34 are closed. Then, in this state, by operating the pump 30, the hydraulic oil is supplied from the pump 30 to the accumulator 31, and, as a result, the hydraulic oil is accumulated in the accumulator 31. After that, the accumulated hydraulic oil in the accumulator 31 is released at once. In this manner, the flow rate of the hydraulic oil released from the accumulator 31 is adjusted by the servo valve 32, and then, the hydraulic oil whose flow rate has been adjusted by the servo valve 32 is supplied to the port A 40.

When the hydraulic oil is supplied to the port A 40, the piston 27 is moved forward by pressure of the hydraulic oil. At this time, the hydraulic oil extruded by the piston 27 moving forward enters the port B 50 and port C 70. The hydraulic oil that has entered the port B 50 and port C 70 is discharged from the port B 50 and port C 70 by opening the logic valve 35, and flows into the accumulator 36 and the tank 37. The piston 27 moves forward when the hydraulic oil is supplied to the port A 40 while the hydraulic oil is discharged from the port B 50 and port C 70 as described above.

Figure 9:
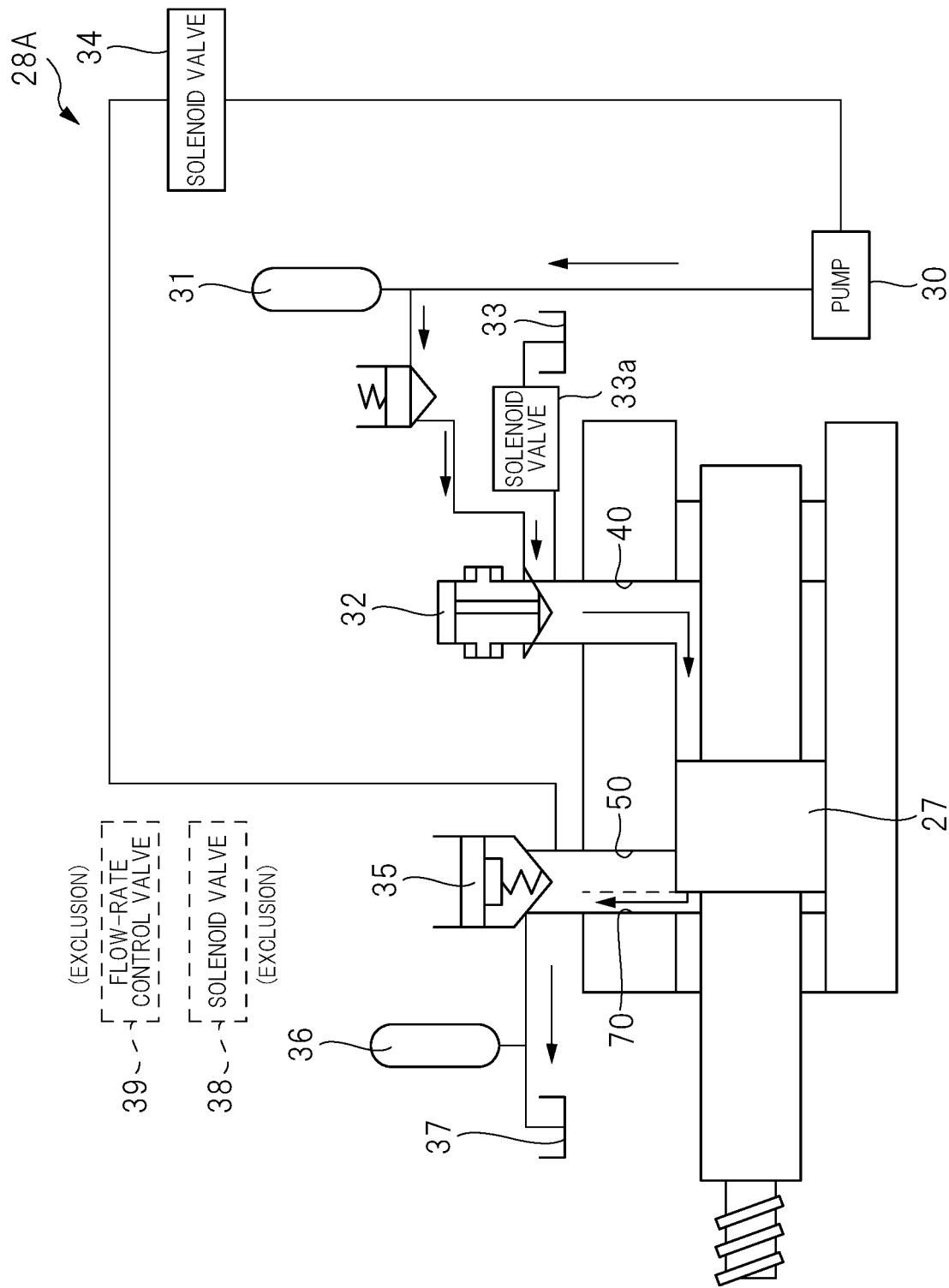
FIG. 9 is a diagram for explaining an "injection operation" in the embodiment.

Then, by the forward movement of the piston 27, the piston 27 closes the port B 50 as shown in FIG. 9. In this case, the hydraulic oil is not discharged from the port B 50, and, as a result, the forward movement of the piston 27 is inhibited. That is, when the piston 27 moves to the position where the piston 27 closes the port B 50, the piston 27 decelerates rapidly.

However, in the embodiment, the port B 50 and port C 70 are communicated to each other. Therefore, even if the port B 50 is closed by the piston 27, the hydraulic oil extruded by the piston 27 is discharged from the port C 70, and flows into the accumulator 36 and the tank 37. In the embodiment, the port B 50 and port C 70 are communicated to each other as described above. As a result, even if the port B 50 is closed by the piston 27, the hydraulic oil is easily discharged from the port C 70. This means that the deceleration of the piston 27 depends on the cross-sectional area (planar area) of the port C 70.

That is, if the planar area of the port C 70 becomes too large, the hydraulic oil can easily be discharged from the port C 70 even if the port B 50 is closed, and therefore, the deceleration of the piston 27 caused by the closing of the port B 50 is moderated. Therefore, from the viewpoint of making the deceleration of the piston 27 large to some extent, it is necessary to suppress the planar area of the port C 70 from being too large. That is, in the embodiment, it can be qualitatively understood that the upper limit of the planar area of the port C 70 is specified from the viewpoint of considering the appropriate deceleration of the piston 27.

In the above-described manner, according to the embodiment, the "injection operation" that is the forward movement of the piston 27 and then the rapid deceleration of the piston 27 can be achieved by using the controller provided in the injection molding machine 100 to control the oil hydraulic power unit 28A.

<<Explanation of Backward Movement of Piston>>

Next, the backward movement of the piston 27 using the oil hydraulic power unit 28A will be described.

Figure 10:
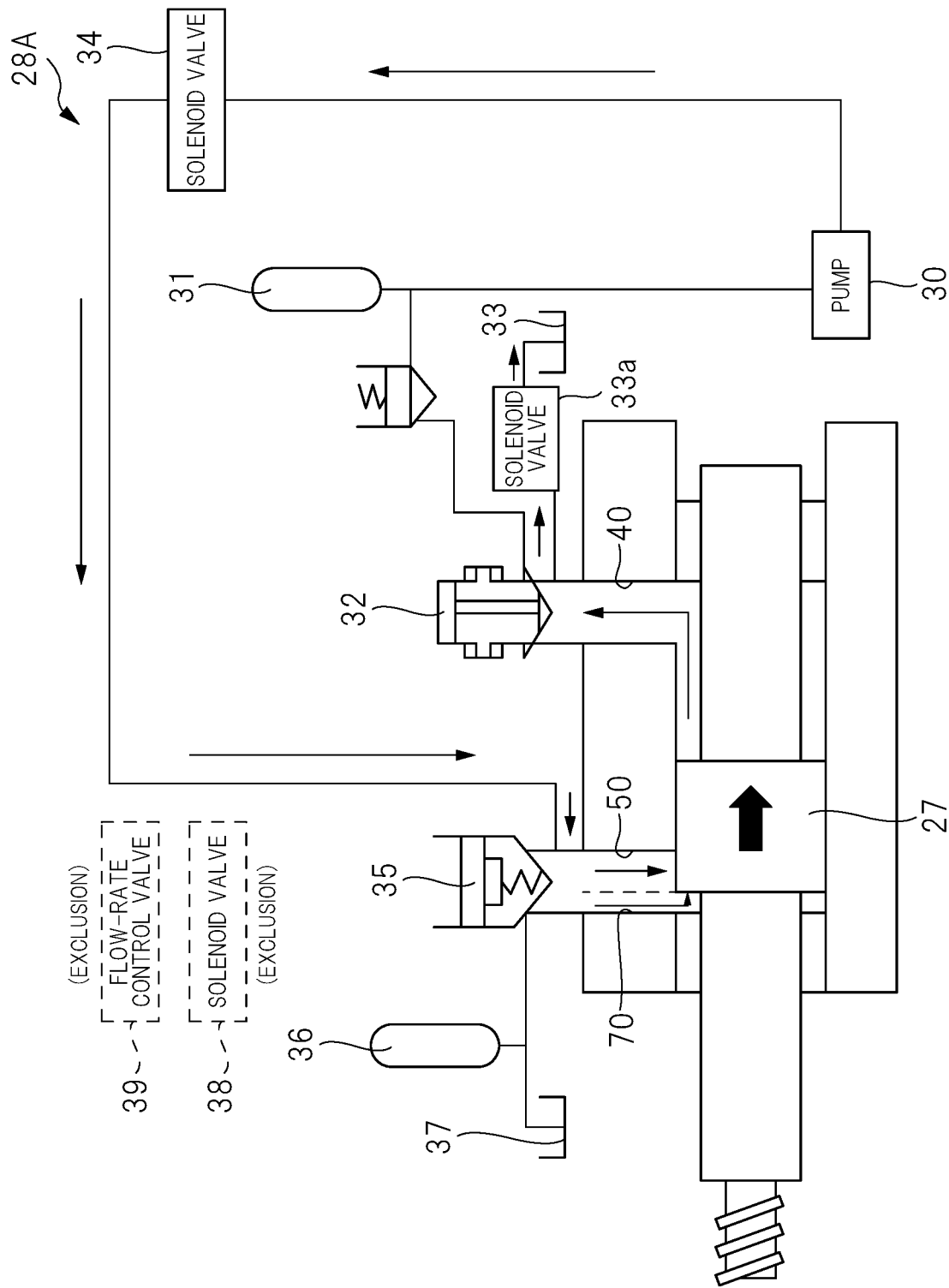
FIG. 10 is a diagram for explaining a backward movement of a piston in the embodiment.

FIG. 10 is a diagram for explaining the backward movement of the piston 27 using the oil hydraulic power unit 28A in the embodiment. In FIG. 10, the pump 30 is operated while the solenoid valves 33a and 34 are open. As a result, the hydraulic oil supplied from the pump 30 passes through the opened solenoid valve 34, and then, is supplied to the port B 50 and the port C 70 communicated to port B 50. In this manner, the hydraulic oil supplied to the port B 50 cannot contact the side surface of the piston 27, and therefore, the piston 27 cannot be moved backward by the hydraulic oil supplied to the port B 50. However, in the embodiment, the hydraulic oil is also supplied to the port C 70 communicated to the port B 50. Therefore, in the embodiment, by the hydraulic oil supplied to the port C 70, pressure is applied to the side surface of the piston 27, and, as a result, the piston 27 moves backward. At this time, the hydraulic oil extruded by the piston 27 moving backward enters the port A 40. Then, by opening the solenoid valve 33a while the servo valve 32 is closed, the hydraulic oil that has entered port A 40 is discharged from the port A 40, and flows into the tank 33. In the manner, according to the embodiment, the piston 27 is moved backward by supplying the hydraulic oil to the port B 50 and port C 70 that are communicated to each other while discharging the hydraulic oil from the port A 40.

Thus, in the embodiment, when the piston 27 is moved backward, the hydraulic oil is supplied to the port B 50, and the hydraulic oil is also supplied to the port C 70 because the port B 50 is communicated to the port C 70. As a result, pressure is applied to the side surface of the piston 27 by the hydraulic oil supplied to the port C 70, and therefore, the piston 27 can move backward. Therefore, if the cross-sectional area (planar area) of the port C 70 is too small, the pressure applied to the side surface of the piston 27 is small, and the backward movement of the piston 27 becomes slow. For this reason, from the viewpoint of ensuring a certain degree of a speed of the backward movement of the piston 27, it is necessary to suppress the planar area of the port C 70 from being too small. That is, in the embodiment, it can be qualitatively understood that the lower limit of the planar area of the port C 70 is specified from the viewpoint of securing an appropriate speed of the backward movement of the piston 27. From the above, in the configuration according to the embodiment in which the port B 50 and the port C 70 are communicated to each other, the upper limit of the flat area of the port C 70 is specified from the viewpoint of the appropriate deceleration of the piston 27, while the lower limit of the planar area of the port C 70 is specified from the viewpoint of securing the appropriate speed of the backward movement of the piston 27.

In summary, the injection molding machine 100 in the embodiment has the following configuration. That is, the injection molding machine 100 includes the injection apparatus 2 that performs the injection operation for the material and the mold clamping apparatus 1 that molds the material injected from the injection apparatus 2.

Here, the injection apparatus 2 includes a screw 23, a piston 27 connected to the screw 23, and an oil hydraulic power apparatus (oil hydraulic power unit) 28A that drives the piston 27 in an axial direction.

The oil hydraulic power unit 28A includes a port A 40 that serves as a supply passage for the hydraulic oil at the time of the forward movement of the piston 27, a port B 50 that serves as a discharge passage for the hydraulic oil at the time of the forward movement of the piston 27, and a port C 70 that serves as a discharge passage for the hydraulic oil when the port B 50 is closed by the piston 27 at the time of the forward movement of the piston 27.

Here, the port B 50 and the port C 70 are communicated to each other to enable the backward movement of the piston 27 by the hydraulic oil supplied to the port C 70 at the time of the backward movement of the piston 27 since the hydraulic oil is supplied to the port B 50 and is also supplied to the port C 70 when the hydraulic oil is discharged from the port A 40. The injection molding machine 100 in the embodiment is configured as described above.

Feature in Embodiment

Next, a feature in the embodiment will be described.

A feature point in the embodiment is that, for example, the port B 50 and port C 70 are communicated to each other as shown in FIG. 7 and FIG. 8. In this manner, for example, the backward movement of the piston 27 typified by "measuring operation" or "suck-back operation" can be achieved simply by providing the oil hydraulic power apparatus that supplies the hydraulic oil to the port B 50, without providing an oil hydraulic power apparatus that supplies the hydraulic oil to the port C 70 as shown in FIG. 10. This is because, in the embodiment, the port B 50 and port C 70 are communicated to each other, and, as a result, the hydraulic oil supplied to the port B 50 is inevitably also supplied to the port C 70, and the pressure is applied to the side surface of the piston 27 by the hydraulic oil supplied to the port C 70, and therefore, the piston 27 can move backward.

That is, according to the feature in the embodiment, it is unnecessary to provide the dedicated flow passage piping and the dedicated oil hydraulic power apparatus for supplying the hydraulic oil to the port C 70 in order to achieve the backward movement of the piston 27, and, as a result, the configuration of the oil hydraulic power unit 28A can be simplified. Specifically, the flow passage piping for supplying the hydraulic oil to the port C 70, the solenoid valve 38, and the flow-rate control valve 39 can be excluded, and therefore, the configuration of the oil hydraulic power unit 28A can be simplified.

Therefore, according to the embodiment, through the simplification of the configuration of the oil hydraulic power unit 28A, the manufacturing cost in the injection molding machine 100 can be reduced, and the reliability of the injection molding machine 100 can be improved. This is because the exclusion of the flow passage piping and the oil hydraulic power apparatus dedicated for the port C 70 can reduce the number of components of the oil hydraulic power unit 28A to reduce the manufacturing cost of the oil hydraulic power unit 28A, and the simplification of the configuration of the oil hydraulic power unit 28A is difficult to cause defects (failures) in the oil hydraulic power unit 28A to improve the reliability of the injection molding machine 100.

From the above, according to the technical idea in the embodiment, the configuration of the oil hydraulic power unit 28A can be simplified by merely changing the configuration of the port B 50 and port C 60 physically separated from each other, to the configuration in which they are physically communicated to each other, and therefore, it can be said that the technical idea in the embodiment is a very excellent technical idea that provides such remarkable effects of the reduction of the manufacturing cost of the injection molding machine 100 and the improvement of the reliability of the injection molding machine 100.

In the foregoing, the invention made by the inventors of the present application has been concretely described on the basis of the embodiments. However, it is needless to say that the present invention is not limited to the foregoing embodiments, and various modifications can be made within the scope of the present invention.

What is claimed is:

1. An injection molding machine comprising:
an injection apparatus configured to perform an injection operation for a material; and
a mold clamping apparatus configured to mold the material injected from the injection apparatus,
wherein the injection apparatus includes:
a screw;
a piston connected to the screw; and
an oil hydraulic power unit configured to drive the piston in an axial direction,
wherein the oil hydraulic power unit includes:
a first port configured to serve as a supply passage for hydraulic oil at a time of a forward movement of the piston;
a second port configured to serve as a discharge passage for the hydraulic oil at a time of a forward movement of the piston; and
a third port configured to serve as a discharge passage for the hydraulic oil when the second port is closed by the piston at a time of a forward movement of the piston, and
the second port and the third port are integrated with each other so that the hydraulic oil is supplied to the second port and is also supplied to the third port when the hydraulic oil is discharged from the first port to enable a backward movement of the piston by the hydraulic oil supplied to the third port at a time of the backward movement of the piston.

2. The injection molding machine according to claim 1, wherein a cross-sectional area of the third port is smaller than a cross-sectional area of the second port.

3. The injection molding machine according to claim 1, wherein the time of the forward movement of the piston is time of an injection operation for the material.

4. The injection molding machine according to claim 1, wherein the time of the backward movement of the piston is time of a suck-back operation.

5. The injection molding machine according to claim 1, wherein the time of the backward movement of the piston is time of a measuring operation.

6. The injection molding machine according to claim 1, wherein the material is a metallic material.

7. The injection molding machine according to claim 6, wherein the material is a magnesium alloy.

8. An injection apparatus for performing an injection operation for a material,
wherein the injection apparatus includes:
a screw;
a piston connected to the screw; and
an oil hydraulic power unit configured to drive the piston in an axial direction,
wherein the oil hydraulic power unit includes:
a first port configured to serve as a supply passage for hydraulic oil at a time of a forward movement of the piston;
a second port configured to serve as a discharge passage for the hydraulic oil at a time of a forward movement of the piston; and
a third port configured to serve as a discharge passage for the hydraulic oil when the second port is closed by the piston at a time of a forward movement of the piston, and
the second port and the third port are integrated with each other so that the hydraulic oil is supplied to the second port and is also supplied to the third port when the hydraulic oil is discharged from the first port to enable a backward movement of the piston by the hydraulic oil supplied to the third port at a time of the backward movement of the piston.

9. The injection apparatus according to claim 8, wherein a cross-sectional area of the third port is smaller than a cross-sectional area of the second port.

10. The injection apparatus according to claim 8, wherein the time of the forward movement of the piston is time of an injection operation for the material.

11. The injection apparatus according to claim 8, wherein the time of a backward movement of the piston is time of a suck-back operation.

12. The injection apparatus according to claim 8, wherein the time of the backward movement of the piston is time of a measuring operation.

13. The injection apparatus according to claim 8, wherein the material is a metallic material.

14. The injection apparatus according to claim 13, wherein the material is a magnesium alloy.

* * * * *